United States Patent [19]
Uchida et al.

[11] Patent Number: 5,307,049
[45] Date of Patent: Apr. 26, 1994

[54] ALARM CONTROL METHOD

[75] Inventors: Takao Uchida; Naoji Akutsu; Jiro Tanuma, all of Tokyo, Japan

[73] Assignee: Oki Electric Industry Co., Ltd., Tokyo, Japan

[21] Appl. No.: 875,013

[22] Filed: Apr. 28, 1992

[30] Foreign Application Priority Data

Apr. 30, 1991 [JP] Japan .................................. 3-097780

[51] Int. Cl.⁵ .............................................. G08B 29/00
[52] U.S. Cl. .................................... 340/507; 340/511; 340/661; 340/664; 340/653; 340/635
[58] Field of Search .............................. 340/507–511, 340/525, 461, 653, 657, 661, 648, 870.04, 870.16, 870.42, 870.21, 870.39, 664, 635

[56] References Cited

U.S. PATENT DOCUMENTS

| | | | |
|---|---|---|---|
| 4,001,818 | 1/1977 | Radichel et al. | 340/653 |
| 4,346,371 | 8/1982 | Ida | 340/507 |
| 4,506,256 | 3/1985 | Genuit et al. | 340/653 |
| 4,559,577 | 12/1985 | Shoji et al. | 361/31 |
| 4,633,358 | 12/1986 | Nagano | 361/31 |
| 4,654,645 | 3/1987 | Yamagishi | 340/661 |
| 4,725,765 | 2/1988 | Miller | 318/434 |
| 4,890,088 | 12/1989 | Woodell | 340/461 |
| 4,937,561 | 6/1990 | Sasaki et al. | 340/646 |
| 4,947,091 | 8/1990 | Fukuoka | 318/434 |
| 5,005,008 | 4/1991 | King | 340/453 |
| 5,053,744 | 10/1991 | Tozawa | 340/461 |

FOREIGN PATENT DOCUMENTS 62-5861 12/1987 Japan .

Primary Examiner—Donnie L. Crosland
Attorney, Agent, or Firm—Edward D. Manzo

[57] ABSTRACT

A drive current for driving actuators is generated based on a first digital signal comprising n-bit binary data which is supplied from a microprocessor and it is applied to an excitation coil. The drive current is supplied to the exciting coil and is converted into a voltage which is then converted into a second digital signal comprising n-bit binary data. The binary data of the second digital signal is compared with the digital data of the first digital signal to detect an alarm condition. Furthermore, the second digital signal is compared with first and second reference value to set plural alarm conditions.

8 Claims, 5 Drawing Sheets

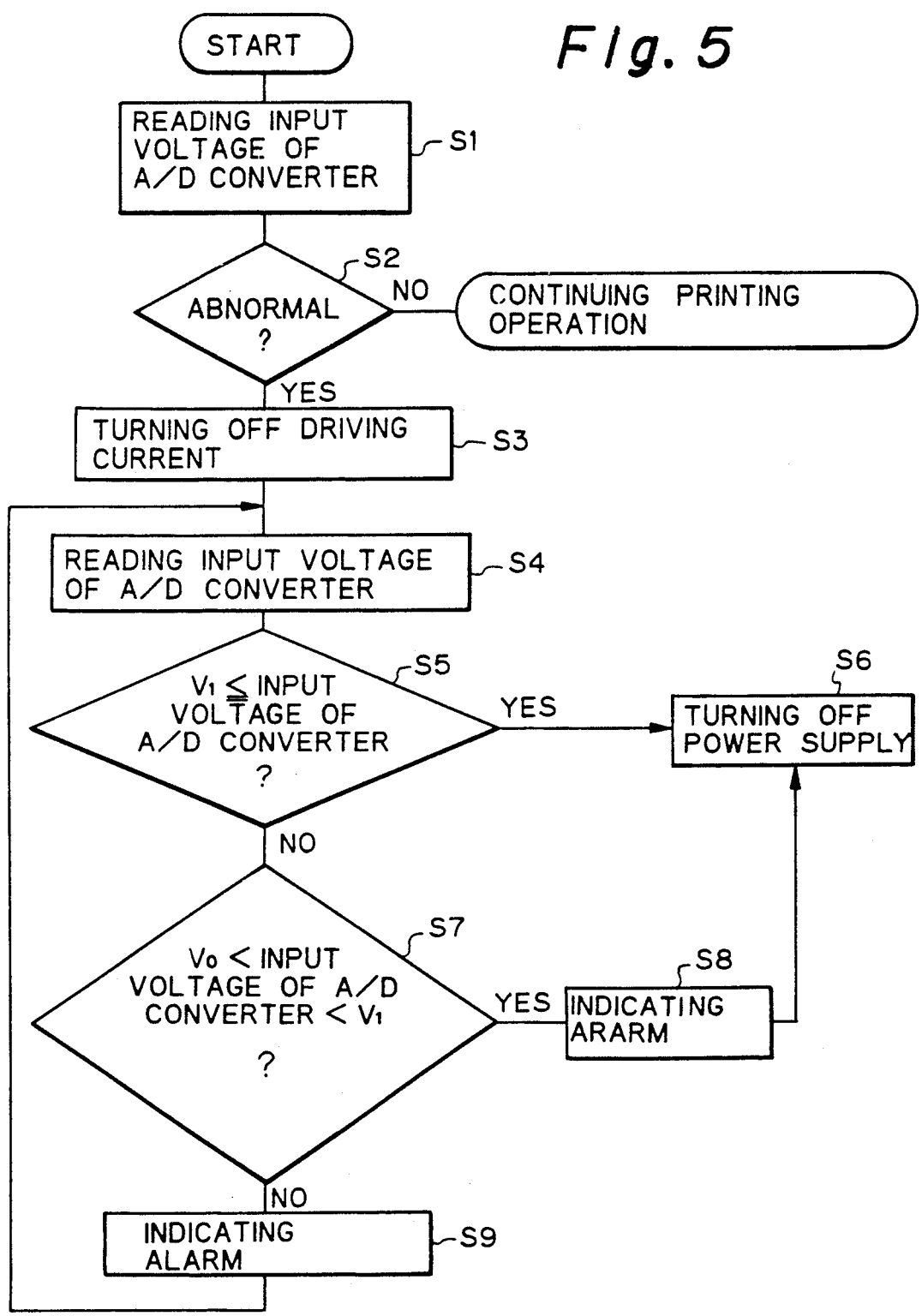

ALARM CONTROL METHOD

BACKGROUND OF THE INVENTION

1. Field of the Invention

The present invention relates to an alarm control method for detecting abnormality in a drive circuit of an actuator.

2. Description of the Related Art

In a serial printer, a space motor is driven to move a print head. A head drive circuit is controlled based on printing data transmitted from a host computer thereby to drive the print head. Upon completion of printing for one line, a line feed motor is driven to perform a line feed so that the printing in the succeeding line is performed.

The serial printer includes a print head, a space motor and a line feed motor respectively serving as an actuator. The serial printer also includes a print head drive circuit for driving the print head, a space motor drive circuit for driving the space motor and a line feed motor drive circuit for driving the line feed motor. These drive circuits are connected to an excitation coil. When a drive current is applied to the excitation coil to drive these actuators.

However, if transistors constituting parts of the drive circuits are broken by an external noise, abnormal current may flow through the excitation coil, or if the excitation coil per se is short-circuited, excessive current may flow in the drive circuits, whereby a fire may occur.

To prevent the fire from occurring, a power supply of the printer is cut off when an alarm signal is supplied by monitoring the current to be supplied to the excitation coil.

However, in the conventional method, an output of the alarm signal on the basis of a reference voltage comprises two kinds of signals, i.e. ON and OFF in which the complete destruction alone is communicated to an operator by the ON signal. That is, the alarm signal is not output in a slightly abnormal condition. Accordingly, it is difficult to detect the abnormal condition and cope with it in early stages.

SUMMARY OF THE INVENTION

It is an object of the present invention to provide an alarm control method capable of detecting an abnormal condition of a drive circuit in early stages without increasing the number of circuit parts.

To achieve the above object, a drive current is applied to an excitation coil for driving an actuator in response to a first digital signal comprising n-bit binary data which is supplied from a microprocessor. The drive current is converted into a voltage and further converted into a second digital signal comprising n-bit binary data by an A/D converter provided inside the microprocessor. Thereafter, the binary data of the second digital signal and that of the first digital signal are compared with each other so as to detect the abnormal condition.

When an abnormal condition is detected by such a comparison between both the binary data, the drive current is stopped. The second digital signal is compared with one or more reference values. Preferably first and second reference values are employed, corresponding to a safe drive current and a maximum drive current, which is at least greater than the first digital signal. The alarm signal is given when the second digital signal reaches the first reference value whereby the power supply is cut off. The power supply is immediately cut off when the second digital signal reaches the second reference signal.

BRIEF DESCRIPTION OF THE DRAWINGS

FIG. 5 is a flow chart showing an alarm control method.

DESCRIPTION OF THE EMBODIMENT

An alarm control method according to a preferred embodiment of the present invention will now be described in detail.

Figure 1:
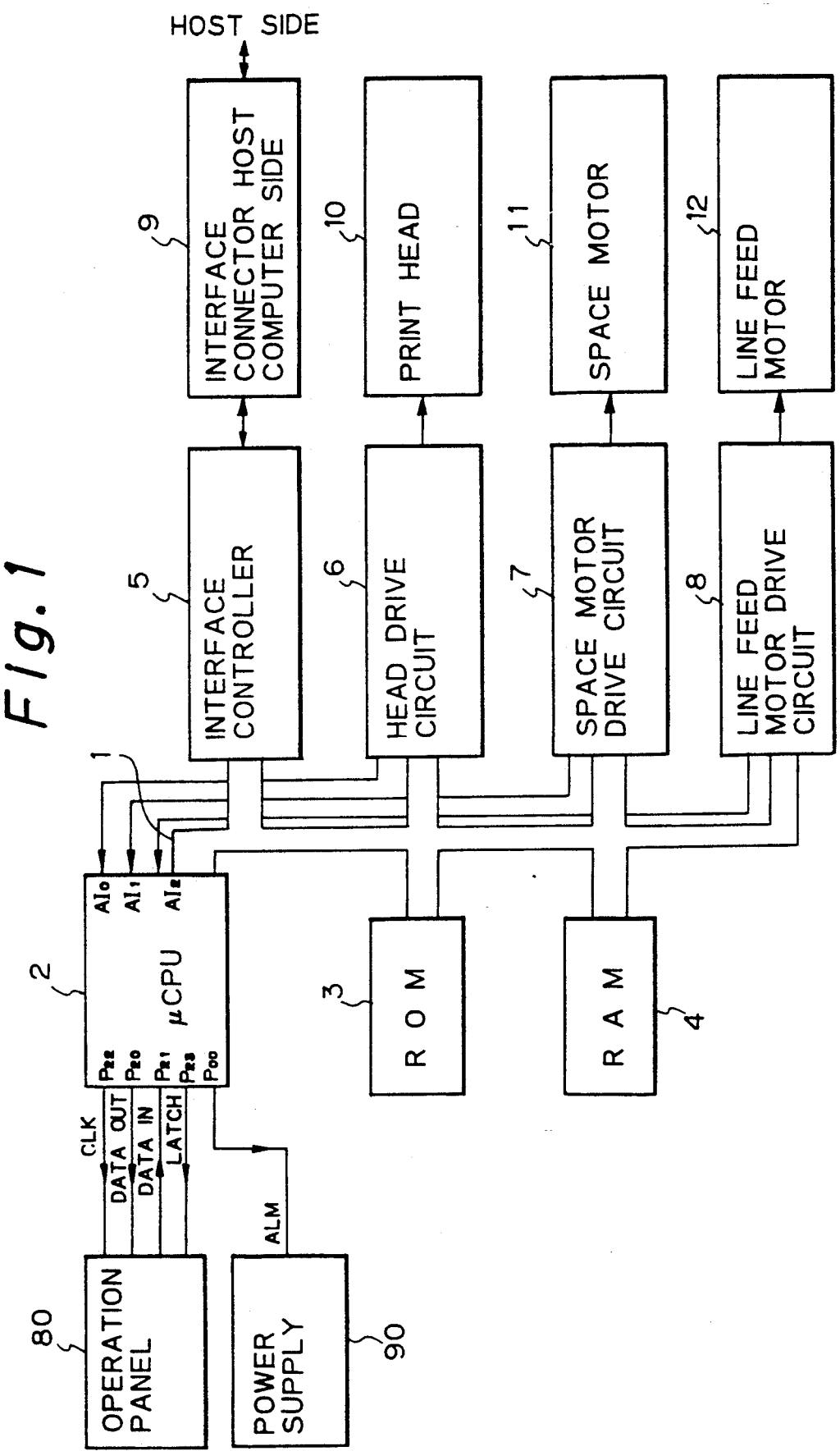
FIG. 1 is a block diagram showing a control circuit of a serial printer according to the present invention.
Figure 2:
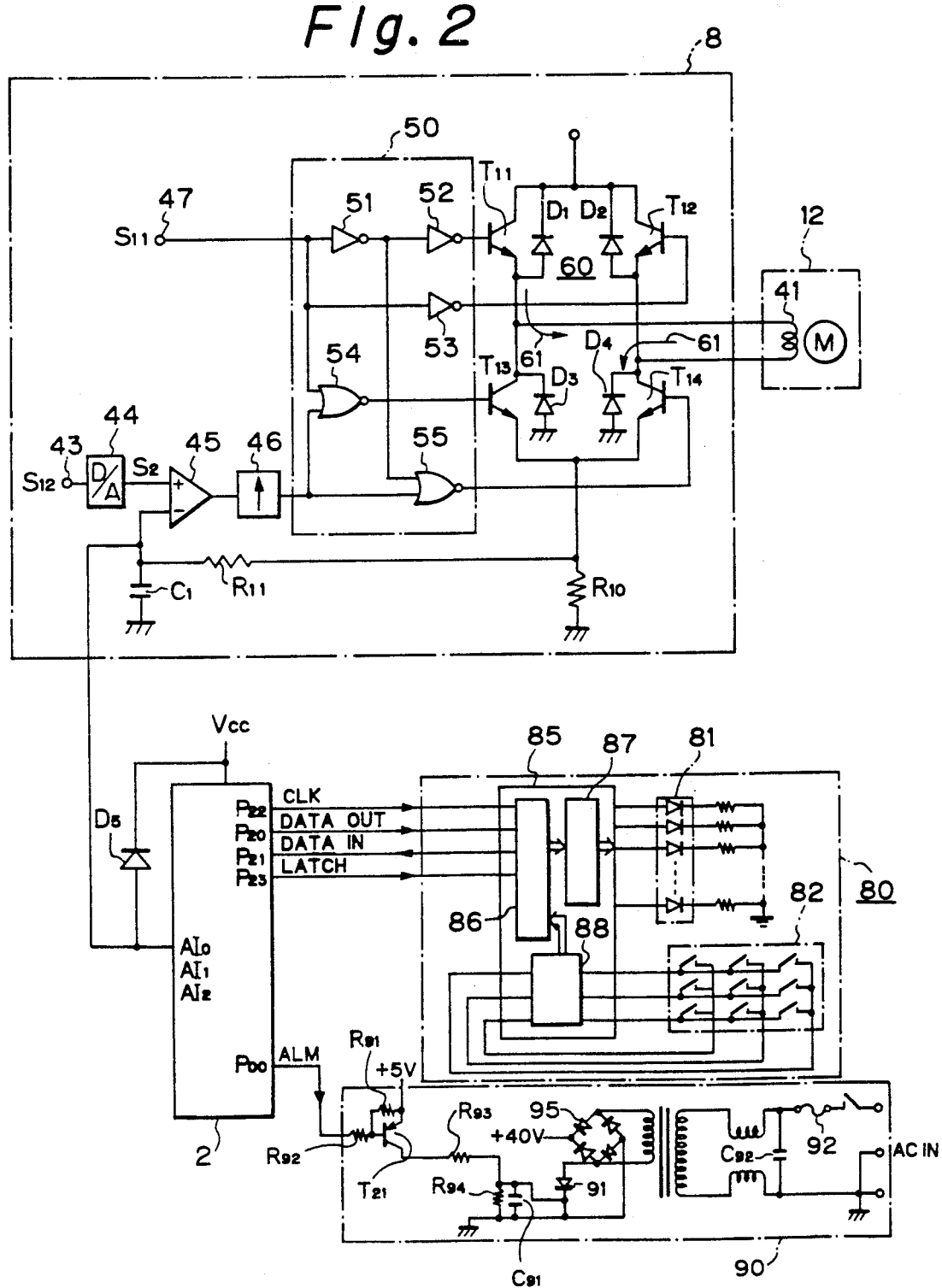
FIG. 2 is a drive circuit diagram employing an alarm control method according to the present invention.

FIG. 1 is a block diagram of a control circuit of a serial printer and FIG. 2 is a drive circuit employing the alarm control method of the present invention.

A bus line 1 connects a microprocessor (μCPU) 2, a read only memory (ROM) 3, a random access memory (RAM) 4, an interface controller 5, a head drive circuit 6, a space motor drive circuit 7 and a line feed motor 8.

The microprocessor 2 employs a 16 bit microcomputer, for example, such as part MSM67X640 manufactured by OKI and performs an arithmetic operation for controlling a printer. The read only memory 3 stores therein an operation program needed for operating a printer. The random access memory 4 stores therein various data needed for performing the arithmetic operation. The interface controller 5 receives serial data transmitted from a host computer through an interface connector 9 and transmits information to the host computer through the interface connector 9.

The head drive circuit 6 drives a print head 10 which performs a given printing operation under the control of the microprocessor 2. The space motor drive circuit 7 drives a space motor 11 for moving the print head 10 in the width direction of the printing medium. The line feed motor 8 drives a line feed motor 12 for controlling the feed of the printing medium (the length direction).

Each of the drive circuits 6, 7 and 8 has a common structure which, as as seen in FIG. 2, comprises a D/A converter 44, a comparator 45, a monostable multivibrator 46, a gate circuit 50 and a switching circuit 60.

An operation panel 80 comprises a plurality of light-emitting diodes (LEDs) 81 for indicating an operating condition or an alarm condition of the printer, a plurality of operating switches (SWs) 82 for inputting an operating instruction by an operator and an operation panel control circuit 85 for controlling the light-emitting diode 81 and the operating switches 82. The operation panel control circuit 85 comprises a latch circuit 86 for transmitting data to and receiving data from the microprocessor 2, an LED drive circuit 87 for activating the light-emitting diodes 81 based on the data transmitted by the microprocessor 2 and a switching control circuit 88 for detecting the actuation of the operating switch 82 on the basis of a given cycle which is transmitted by the microprocessor 2 and outputting an input data from the operating switches 82 to the microprocessor 2 through the latch circuit 86 upon detection that one of the operating switches 82 has been actuated.

A power supply 90 converts an a/c voltage into a d/c voltage and supplies the power supply to each part of the printer. It will be noted that in both FIG. 1 and FIG. 2, microprocessor 2 has an output P00 for an alarm signal. That output is connected to power supply circuit 90.

An operation of each drive circuit 6, 7 and 8 will be described by exemplifying the line feed motor drive circuit 8 in FIG. 2.

When a control signal $S_{11}$ for driving the motor is input to a terminal 47 from the microprocessor 2, the terminal 47 goes to a high level. At the same time, a digital signal $S_{12}$ comprising n-bit binary data (8 bits in the present embodiment) (hereinafter referred to as pulse width modulation: PWM signal) for setting a given driving current is input to the D/A converter 44 from the terminal 43 through the microprocessor 2. The D/A converter 44 converts the digital signal $S_{12}$ into an analog signal and applies the setting signal $S_2$ to an inverting terminal of the comparator 45. The comparator 45 rises upon reception of the setting signal $S_2$. Although the output of the monostable multivibrator 46 is at first a low level, it is triggered when the output of the comparator 45 rises and is maintained at the high level for a given time.

When the high level control signal $S_{11}$ is input to the gate circuit 50 from the terminal 47 and the low level setting signal $S_2$ is input to the gate circuit 50 through the monostable multivibrator 46, the output of the inverter 52 goes high the output of the inverter 53 goes low, the output of a NOR gate 54 goes low, and the output of a NOR gate 55 goes high. Accordingly, transistors $T_{11}$ and $T_{14}$ of the switching circuit 60 are turned on. Consequently, the driving current is supplied to the excitation coil 41 in the direction of an arrow as denoted at 61 and the excitation current is gradually increased in the excitation coil 41. A voltage proportional to the driving current forms a terminal voltage of a resistor $R_{10}$ of a feedback circuit. The terminal voltage of the resistor $R_{10}$ is fedback to the inverting input terminal of the comparator 45 through a resistor $R_{11}$.

Figure 3:
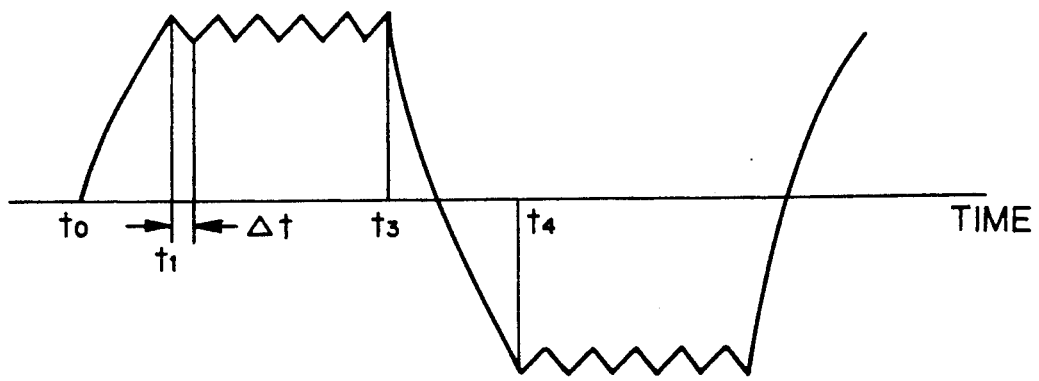
FIG. 3 is a time chart of a driving current which is generated in the drive circuit.

As illustrated in FIG. 3, which shows drive current vs. time, when the switching circuit 60 is turned on at the time $t_0$ and a detected signal exceeds the setting signal which is input in the inverting terminal of the comparator 45 at the time $t_1$ where the output of the comparator rises. At this time, the output of the monostable multivibrator 46 goes high and the output of the NOR gate 55 is switched to the low level. Other outputs of the gate circuit 50 are, however, not varied at this time.

As a result, the transistor $T_{14}$ is turned off so that the drive current is not supplied to the excitation coil 41. The terminal voltage across the resistor $R_{10}$ drops and the output of the comparator 45 rises again. On the other hand, the output of the monostable multivibrator 46 goes low after the lapse of given time $\Delta t$ turning on the transistor $T_{14}$ again.

Such series of operations are repeated during the time period between $t_1$ and $t_3$ and the driving current is maintained at a given value during this time period between $t_1$ and $t_3$. When the control signal $S_{11}$ to terminal 47 goes low at time $t_3$, the transistor $T_{14}$ is turned off so that the driving current of coil 41 becomes 0.

Protective diodes $D_1$ to $D_4$ bypass the current which flows to the excitation coil 41 immediately after the transistors $T_{11}$ to $T_{14}$ are turned on or turned off.

As illustrated in FIG. 2, when the control signal $S_{11}$ input to the terminal 47 of the gate circuit 50 goes low, the transistors $T_{12}$ and $T_{13}$ are turned on. As a result, the drive current opposite to the arrow 61 is applied to the excitation coil 41. The operation after the time $t_4$ is the same as that between the times $t_1$ to $t_4$.

In each of the drive circuits, a given drive current is supplied to the excitation coil 41 in response to the setting signal $S_2$ to be supplied to a noninverting terminal of the comparator 45.

The current to be supplied to the excitation coil 41 is converted into a voltage by a resistor $R_{10}$ of a feedback circuit and is applied to an input terminal $AI_0$ of the A/D converter of the microprocessor 2 through a resistor $R_{11}$. A diode $D_5$ protects the input terminal $AI_0$ of the A/D converter. The drive circuits 6 and 7 function in the same way as the drive circuit 8. Namely, the current to be supplied to the excitation coil is converted into a voltage by a resistor of a feedback circuit and is applied to an input terminal $AI_1$ or $AI_2$ of the A/D converter of the microprocessor 2 through a resistor.

Figure 4:
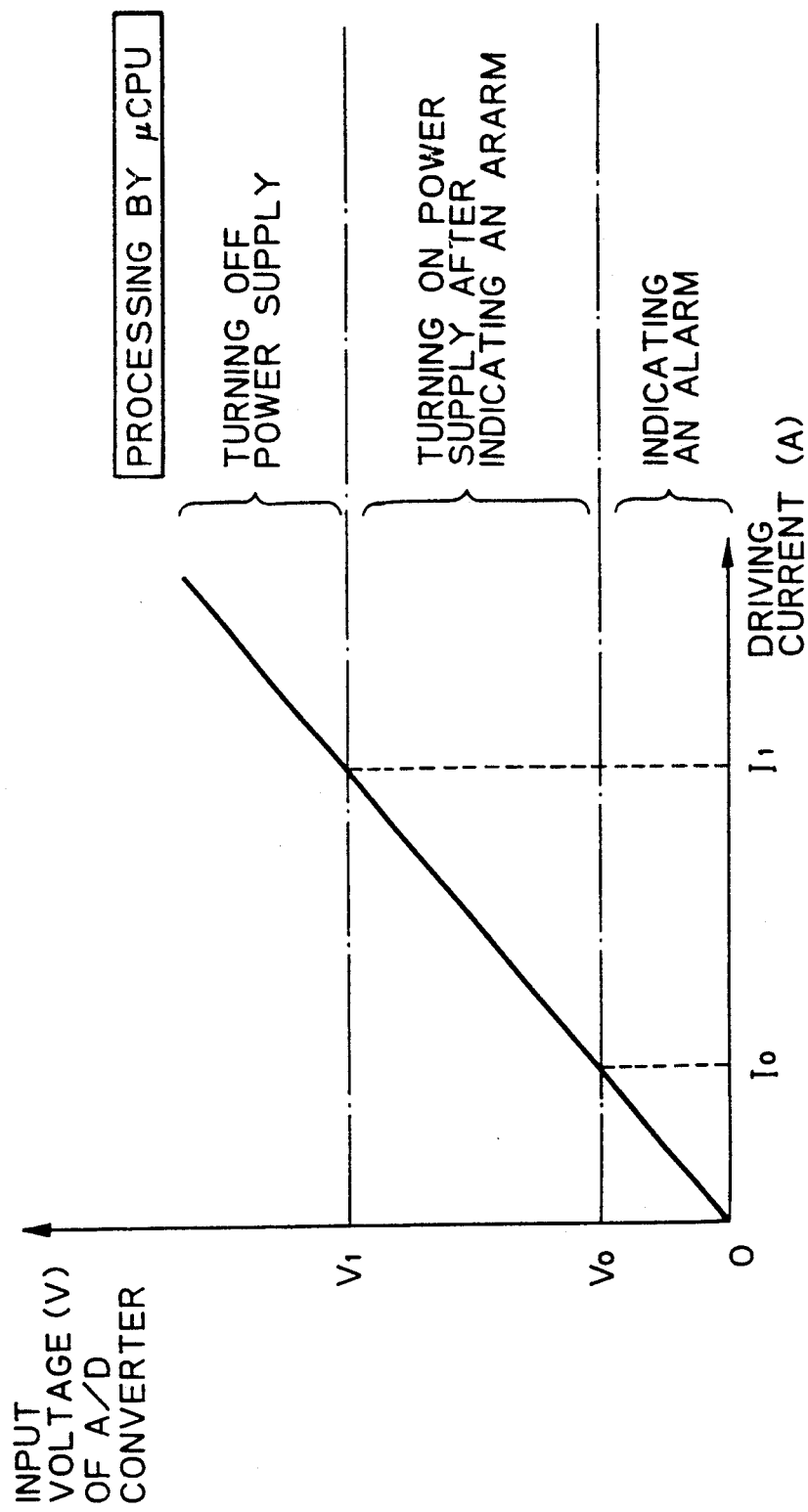
FIG. 4 is a graph showing a relation between a driving current of an excitation coil and a voltage to be applied to an input terminal of an A/D converter in a microprocessor.

FIG. 4 is a view showing the relation between the drive current to be applied to the excitation coil and a voltage to be applied to an input terminal of the A/D converter of the microprocessor.

In the same figure, a drive current $I_0$ represents the critical current beneath which any abnormal condition does not occur in the excitation coil 41 even if power continues to be applied and an input voltage at that time is $V_0$. Denoted at $I_1$ is a maximum drive current in a practical operation. An input voltage at that time is $V_1$.

The microprocessor 2 utilizes a sensing cycle applied to e.g. an operating switch 82 to thereby read regularly an analog voltage to be applied the input terminal AI of the A/D converter. The thus read voltage is converted into a digital value which comprises the n-bit binary data (8 bits in this embodiment. The thus converted data is compared 7ith the digital signal $S_{12}$ which is supplied to the drive circuit considering the deviation of the circuit elements and the reading error due to the noise factor.

If there is no difference between the digital data and the digital signal $S_{12}$, the drive circuit is judged to be normal and continues its operation. When the value of the voltage supplied to the input terminal $AI_0$ of the A/D converter exceeds the digital signal $S_{12}$, the drive circuit is judged to be abnormal so that the microprocessor 2 resets the digital signal $S_{12}$ thereby to stop the printing operation. The microprocessor 2 reads again the voltage to be applied to the input terminal $AI_0$ of the A/D converter in the reset condition. If the thus read value of the voltage exceeds a given voltage value $V_1$, the read voltage is recognized to be abnormal so that the microprocessor 2 immediately cuts off the power supply to the printer.

If the read voltage is incompletely abnormal and less than the voltage value $V_0$ (which is recognized not to generate any problem even if the input voltage continues to supply the abnormal current), the power supply supplied to the printer is turned ON but the alarm condition is given to an operator by the light-emitting diode 81. However, it is expected that the incomplete abnormal condition is changed to the complete abnormal condition, so that the current should be monitored regularly.

When the voltage to be applied to the input terminal AI$_0$ of the A/D converter is between the voltage values V$_0$ and V$_1$, the alarm is given to the operator in the same way as though the voltage is less than the voltage value V$_0$ and thereafter the alarm signal ALM is output for thereby cutting off the power supply to the printer. Accordingly, the operator can judge the presence and the degree of the abnormal condition when the power supply is turned on again.

Described hereinafter is a method of cutting off the power supply which is supplied to the printer according to the present embodiment.

When the alarm signal ALM is output from the output Terminal p$_{00}$ of the microprocessor 2, a transistor T$_{21}$ of the power supply 90 is turned on. When the transistor T$_{21}$ is turned on, a thyristor 91 becomes conductive so that a secondary winding of the power supply 90 is short-circuited electrically. Accordingly, an excess current is supplied to the primary winding of the power supply 90 whereby a fuse is blown and the power supply to the printer is cut off.

FIG. 5 is a flow chart showing the alarm control method according to the present invention. Operations in each step will be described with reference to this flow chart.

Step 1: The voltage applied to the input terminal AI$_0$ of the A/D converter is read at e.g., a cycle sensing for the operating switch 82 which is predetermined by the microprocessor.

Step 2: The read voltage is compared with the digital signal S$_{12}$ to set the drive current. If there is no difference between the read voltage and the digital signal S$_{12}$, the drive circuit is judged to be normal so that the printing operation continues. If the value of the voltage to be supplied to the input terminal AI$_0$ of the A/D converter is greater than the digital signal S$_{12}$, the program goes to Step 3.

Step 3: The digital signal S$_{12}$ is reset so that the driving current is stopped from being supplied to the drive circuit so that the printing operation is stopped.

Step 4: The voltage to be supplied to the input terminal AI$_0$ of the A/D converter is read again.

Step 5: At this decision diamond, the voltage AI$_0$ of the A/D converter is tested to determine whether it is equal to or greater than the voltage value V$_1$ (which is recognized to be completely abnormal). When the voltage AI$_0$ of the A/D converter is equal to or greater than the voltage value V$_1$, the program goes to Step 6. But when the voltage AI$_0$ of the A/D converter is less than the voltage value V$_1$, the program goes to Step 7.

Step 6: The alarm signal ALM is output from the output terminal p$_{00}$ of the microprocessor 2 so that the power supply to the printer is cut off.

Step 7: At this decision diamond, the voltage AI$_0$ of the A/D converter is tested to see whether it is between the voltage values V$_0$ to V$_1$. If the voltage AI$_0$ of the A/D converter is greater than the voltage value V$_0$ but less than the voltage value V$_1$, the program goes to Step 8. But if the voltage AI$_0$ of the A/D converter is less than the voltage value V$_0$ or greater than the voltage value V$_1$, the program goes to Step 9.

Step 8: The microprocessor 2 outputs an alarm signal to the latch circuit 86 of the operation panel control circuit 85 by way of a serial signal terminal P$_{20}$ and the program goes to Step 6.

Step 9: The alarm is given to the operator and the program returns to Step 4.

The present invention is not limited to the embodiment set forth above but can be varied variously based on a gist of the present invention which is not excluded from the scope of the present invention.

For example, the present invention can be applied not only to the serial printer but to all the systems having drive circuits.

What is claimed is:

1. An alarm control method comprising the steps of:
   providing a first digital signal having n bits, n being a positive integer, from a processor circuit having an analog/digital function, and controlling a current flowing through at least one actuator in accordance with the first digital signal;
   generating a second digital signal having n bits, based on a value of a current actually flowing through said at least one actuator;
   comparing digital data of said first digital signal with digital data of said second digital signal; and
   detecting an alarm condition when said digital data of the second digital signal is greater than that of the first digital signal.

2. The method of claim 1 further comprising the steps of:
   terminating said step of providing of said first digital signal when said alarm condition is detected; and
   responding to said alarm condition, including determining a relationship between said second digital signal and a reference value greater than said first digital signal.

3. The alarm control method of claim 2 wherein said determining step uses first and second non-identical reference values.

4. The alarm control method of claim 3 including producing an alarm signal in response to the alarm condition and:
   wherein said actuator is powered in normal operation;
   wherein said second reference value is greater than said first reference value;
   wherein when the second digital signal is less than both the first and second reference values, said alarm signal is produced;
   wherein when the second digital signal is greater than the first reference value but less than the second reference value, the alarm signal is produced and power is cut off to said actuator; and
   wherein when the second digital signal is greater than the first and second reference values, the alarm signal is produced and power is immediately cut off to said actuator.

5. The alarm control method of claim 1 wherein said processing circuit includes a microprocessor.

6. The method of claim 5 wherein said first and second digital signals are compared in said microprocessor.

7. An alarm control method comprising the steps of:
   providing a first digital signal having n bits, n being a positive integer, from a processor circuit having an analog/digital function;
   controlling a current flowing through at least one actuator in accordance with the first digital signal, including converting said first digital signal to a first analog signal;
   providing a feedback signal to said processor circuit indicative of a current actually flowing in said actuator;
   generating in said processor circuit a second digital signal having n bits, based on said actuator current;

comparing in said processor circuit digital data of said first digital signal with digital data of said second digital signal;

comparing said second digital signal with a reference value; and selectively providing an alarm signal based on said comparing step.

8. The method of claim 7 further comprising selectively terminating a power supply that is used in said step of controlling a current, said terminating being based on said comparing step.

* * * * *